United States Patent
Matsumoto

(10) Patent No.: US 9,496,802 B2
(45) Date of Patent: Nov. 15, 2016

(54) INVERTER DEVICE

(71) Applicant: KABUSHIKI KAISHA TOYOTA JIDOSHOKKI, Kariya-shi, Aichi-ken (JP)

(72) Inventor: Naotaka Matsumoto, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 23 days.

(21) Appl. No.: 14/650,425

(22) PCT Filed: Nov. 20, 2013

(86) PCT No.: PCT/JP2013/081248
§ 371 (c)(1),
(2) Date: Jun. 8, 2015

(87) PCT Pub. No.: WO2014/097804
PCT Pub. Date: Jun. 26, 2014

(65) Prior Publication Data
US 2015/0311819 A1    Oct. 29, 2015

(30) Foreign Application Priority Data
Dec. 20, 2012   (JP) .................................. 2012-278245

(51) Int. Cl.
*H02M 7/5387* (2007.01)
*H02M 7/537* (2006.01)
(Continued)

(52) U.S. Cl.
CPC .............. *H02M 7/537* (2013.01); *H02M 1/14* (2013.01); *H02M 1/42* (2013.01); *H02M 7/5387* (2013.01); *H02P 23/26* (2016.02); *H02P 27/085* (2013.01)

(58) Field of Classification Search
CPC ........ H02M 1/14; H02M 1/42; H02M 7/537; H02M 7/5387; H02P 23/26; H02P 7/08; H02P 7/085
See application file for complete search history.

(56) References Cited

U.S. PATENT DOCUMENTS 5,699,240 A * 12/1997 Obayashi .......... H02M 7/53875
                                                    318/811
7,053,587 B2 *  5/2006 Ito ......................... H02P 27/085
                                                    318/721
(Continued)

FOREIGN PATENT DOCUMENTS

JP          7-46855 A        2/1995
JP       2003-33042 A        1/2003
(Continued)

OTHER PUBLICATIONS

International Search Report for PCT/JP2013/081248 dated Feb. 25, 2014 [PCT/ISA/210].
(Continued)

*Primary Examiner* — Matthew Nguyen
(74) *Attorney, Agent, or Firm* — Sughrue Mion, PLLC

(57) ABSTRACT

An inverter device includes a three-phase inverter, which has switching elements, and a controller, which is programmed to perform two-phase modulation control on switching of the switching elements between an ON state and an OFF state. The controller computes the power factor of a load. The controller determines whether or not the computed power factor is less than a preset threshold value. If the computed power factor is greater than or equal to the threshold value, the controller performs a phase shift to shift the central time point of an ON period or an OFF period for two phases other than a stop phase in the two-phase modulation control by 180 degrees, and if the computed power factor is less than the threshold value, the controller supplies the switching elements with ON and OFF control commands to perform the two-phase modulation control without performing the phase shift.

5 Claims, 3 Drawing Sheets

(51) Int. Cl.
*H02M 1/14* (2006.01)
*H02P 27/08* (2006.01)
*H02M 1/42* (2007.01)

(56) References Cited

U.S. PATENT DOCUMENTS

| | | | | |
|---|---|---|---|---|
| 8,077,491 | B2* | 12/2011 | Yamasaki | H02M 7/53873 |
| | | | | 363/132 |
| 8,604,732 | B2* | 12/2013 | Kawashima | H02P 27/08 |
| | | | | 318/400.02 |
| 2014/0176027 | A1* | 6/2014 | Osaki | H02P 6/002 |
| | | | | 318/400.2 |
| 2015/0155804 | A1* | 6/2015 | Sakai | H02P 27/085 |
| | | | | 318/400.27 |
| 2015/0288305 | A1* | 10/2015 | Mendoza | H02P 6/14 |
| | | | | 318/400.02 |

FOREIGN PATENT DOCUMENTS

| | | |
|---|---|---|
| JP | 2005-51838 A | 2/2005 |
| JP | 2005-229716 A | 8/2005 |
| JP | 2006-197707 A | 7/2006 |

OTHER PUBLICATIONS

An International Preliminary Report on Patentability dated Jun. 23, 2015 from the International Bureau in counterpart International Application No. PCT/JP2013/081248.

* cited by examiner

INVERTER DEVICE

CROSS REFERENCE TO RELATED APPLICATIONS

This application is a National Stage of International Application No. PCT/JP2013/081248, filed on Nov. 20, 2013, which claims priority from Japanese Patent Application No. 2012-278245, filed on Dec. 20, 2012, the contents of all of which are incorporated herein by reference in their entirety.

TECHNICAL FIELD

The present invention relates to an inverter device. More specifically, the present invention relates to an inverter device suitable for driving an induction motor through two-phase modulation control.

BACKGROUND ART

When driving a three-phase AC motor, an inverter device that converts a DC current supplied from a DC power supply into a three-phase (U-phase, V-phase, and W-phase) AC current performs a switching control (Pulse Width Modulation (PWM) control) to drive the motor. The inverter device includes a smoothing capacitor connected to the input of the inverter device in parallel with the DC power supply, which smoothes the input current.

When driving the three-phase AC motor, a switching loss is large in the three-phase modulation control in which the phases are constantly switched. A two-phase modulation control, in which any one of the phases is constantly non-switched, is used for reducing the switching loss. In the standard two-phase modulation control, the central time point of a period during which the switching elements of the two phases for which the switching is being performed are turned on coincides with the central time point of a period during which the switching elements of the two phases are turned off. For example, when the switching of the switching element of the W-phase is stopped and the switching of each of the switching elements of the U-phase and the V-phase is performed, the timing chart of the control voltage is as shown in FIG. 4A.

In the two-phase modulation control, at the starting and ending time points of a period (switching stop period) in which the voltage is maintained at a high potential level or a low potential level, the voltage value of each phase sharply changes. This is a factor of increasing a current ripple. In the two-phase modulation control, the change of the voltages in each phase in the case in which the switching is not performed at the time point of the peak of the voltage is different from that in the case in which the switching is not performed at the time point of the peak of the current as shown in FIGS. 5 and 6.

If the case in which the switching is not performed at the peak of the voltage in FIG. 5 is compared with the case in which the switching is not performed at the peak of the current in FIG. 6, the change ratio of the voltage at the starting and ending time points of the switching stop period is greater in the case in which the switching is not performed at the peak of the current than in the case in which the switching is not performed at the peak of the voltage. Accordingly, in the two-phase modulation control, the period in which the switching is not performed (switching stop period) is set at the time point of the peak of the current of each phase whenever possible.

In the inverter device of the two-phase modulation control for driving the three-phase AC motor, it has been proposed that the phase shift is performed on the central time point of the period in which one of the switching elements of the two phases for performing the PWM control is turned on or off by $\pi$ (180 degrees) to reduce the ripple current generated in the smoothing capacitor as shown in FIG. 4B. Refer to Patent Document 1. The value $\pi$ corresponds to a half value of the PWM carrier period $2\pi$.

PRIOR ART DOCUMENT

Patent Document

Patent Document 1: Japanese Laid-Open Patent Publication No. 2003-33042

SUMMARY OF THE INVENTION

Problems that the Invention is to Solve

In the two-phase modulation control, the switching elements are controlled to avoid switching at the time point of the peak of the current in each phase whenever possible to reduce the switching loss. If the power factor is one, the time point of the peak of the voltage is the same as the time point of the peak of the current. If the power factor is low, the peak of the voltage and the peak of the current are shifted from each other.

If the three-phase AC motor is an induction motor, the motor is frequently used under the conditions in which the power factor is less than one, for example, the power factor is in the range from 0.7 to 0.8. However, if the power factor is too low, the performing of the phase shift rather increases the ripple current in the smoothing capacitor.

An objective of the present invention is to provide an inverter device that reduces a ripple current occurring in a smoothing capacitor provided in the input of an inverter circuit when an induction motor is controlled according to a two-phase modulation control so that the size and costs of the smoothing capacitor are reduced.

Means for Solving the Problems

In order to achieve the above described objective, an inverter device including a three-phase inverter and a controller is provided. Each phase includes a switching element on a high potential side and a switching element on a low potential side. The controller is capable of performing two-phase modulation control on switching of the switching elements between an ON state and an OFF state. The inverter device further includes a power factor computation unit, which computes a power factor of a load, and a determination unit, which determines whether the power factor computed by the power factor computation unit is less than a preset threshold value. If the determination unit determines that the computed power factor is greater than or equal to the threshold value, the controller performs a phase shift to shift a central time point of an ON period or a central time point of an OFF period for two phases other than a stop phase in the two-phase modulation control by 180 degrees. If the determination unit determines that the computed power factor is below the threshold value, the controller supplies the switching elements with ON and OFF control commands to perform the two-phase modulation control without performing the phase shift.

MODES FOR CARRYING OUT THE INVENTION

Hereinafter, an inverter device according to one embodiment will be described according to FIGS. 1 to 3.

Figure 1:
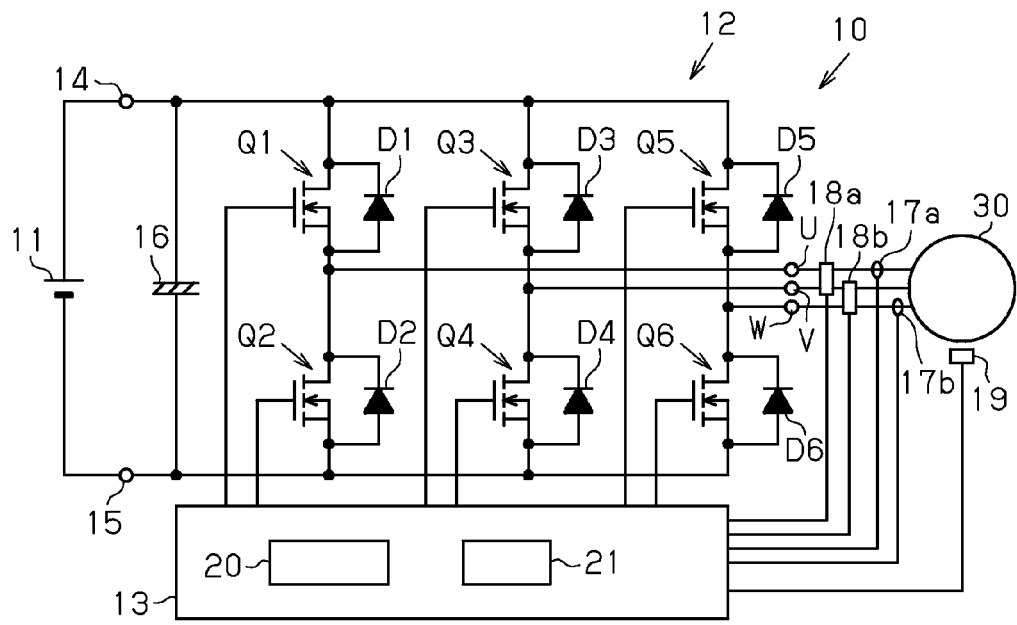
FIG. 1 is a circuit diagram of an inverter device according to one embodiment.
Figure 2:
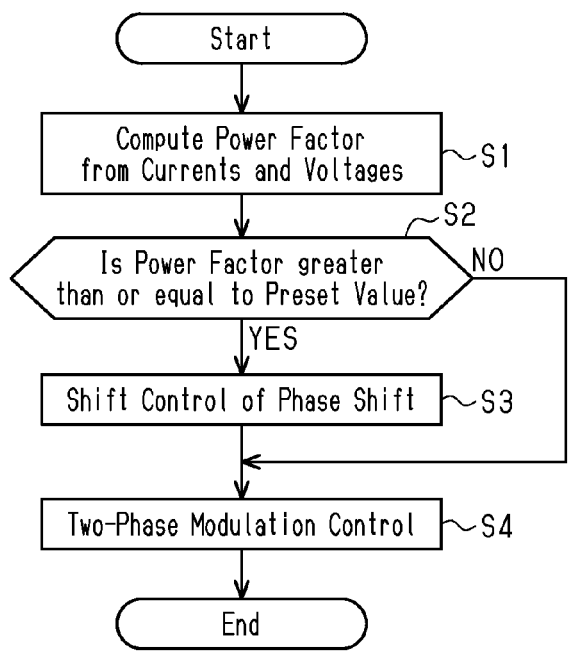
FIG. 2 is a flowchart illustrating an operation of a controller.

As shown in FIG. 1, an inverter device 10 includes a three-phase inverter 12, which is connected to a battery 11 as a DC power supply, and a controller 13. The three-phase inverter 12 includes switching elements Q1, Q3, and Q5 on a high potential side and switching elements, Q2, Q4, and Q6 on a low potential side. The switching elements Q1, Q2, and Q3, Q4, and Q5, Q6 configure corresponding phases. The controller 13 is capable of performing two-phase modulation control for switching ON and OFF states of the switching elements Q1, Q3, and Q5 on the high potential side and the switching elements Q2, Q4, and Q6 on the low potential side.

For example, a MOSFET is used for each of the switching elements Q1 to Q6. In the three-phase inverter 12, the first and second switching elements Q1 and Q2 are connected in series, the third and fourth switching elements Q3 and Q4 are connected in series, and the fifth and sixth switching elements Q5 and Q6 are connected in series.

The drains of the first, third, and fifth switching elements Q1, Q3, and Q5 are connected to a positive input terminal 14 for power input, and the sources of the second, fourth, and sixth switching elements Q2, Q4, and Q6 are connected to a negative input terminal 15 for power input. Between the positive input terminal 14 and the negative input terminal 15, a smoothing capacitor 16 is connected in parallel with the battery 11.

Between each pair of the drains and sources of the switching elements Q1 to Q6, corresponding one of diodes D1 to D6 is connected by an anti-parallel connection. Each of the first, third, and fifth switching elements Q1, Q3, and Q5 and the corresponding one of the diodes D1, D3, and D5 connected thereto form a structure that is referred to as an upper arm. Also, each of the second, fourth, and sixth switching elements Q2, Q4, and Q6 and the corresponding one of the diodes D2, D4, and D6 connected thereto form a structure that is referred to as a lower arm.

The node between the switching elements Q1 and Q2 is connected to a U-phase terminal U, the node between the switching elements Q3 and Q4 is connected to a V-phase terminal V, and the node between the switching elements Q5 and Q6 is connected to a W-phase terminal W. The three-phase inverter 12 is connected through the U-phase terminal U, the V-phase terminal V, and the W-phase terminal W to the three-phase induction motor 30 and used.

Current sensors 17a and 17b and voltage sensors 18a and 18b are provided between the three-phase inverter 12 and the three-phase induction motor 30, which is connected to the three-phase inverter 12 through the U-phase terminal U, the V-phase terminal V, and the W-phase terminal W. The current sensors 17a and 17b detect currents Iu and Iw of two phases (in the present embodiment, U-phase and W-phase) of currents Iu, Iv, and Iw of three phases supplied to the three-phase induction motor 30. The voltage sensor 18a detects a line voltage between the U-phase and the V-phase, and the voltage sensor 18b detects a line voltage between the V-phase and the W-phase. The three-phase induction motor 30 includes an angle sensor 19, which detects a position, i.e., a rotation angle of the rotation shaft (not shown) of the motor 30.

The controller 13 includes a CPU 20 and a memory 21. The controller 13 configures a power factor computation unit, which computes a power factor of a load, and a determination unit, which determines whether the power factor computed by the power factor computation unit is less (smaller) than a preset threshold value. The controller 13 sequentially maintains the switching elements of one of the U-phase, the V-phase and the W-phase on or off, and configures a control signal generating and supplying unit, which generates and supplies PWM control signals for the switching elements of the remaining two phases. The power factor computation unit, the determination unit, and the control signal generating and supplying unit are not configured by hardware but by software according to programs stored in the memory 21.

The CPU 20 computes the power factor of the three-phase induction motor 30 as a load using the detection signals of the current sensors 17a and 17b and the voltage sensors 18a and 18b. The power factor is computed by a publicly-known method.

The memory 21 stores a control program for performing the two-phase modulation control of the three-phase induction motor 30 such that the stop period of the stop phase is set across the peak of the current. The memory 21 stores a control program of the two-phase modulation control to which the phase shift is added to shift the central time point of the ON period or the central time point of the OFF period of the switching elements of the two phases other than the stop phase by 180 degrees. The memory 21 also stores a control program of the two-phase modulation control without phase shift. The control programs of the two-phase modulation control are basically the same as the publicly-known programs.

The memory 21 also stores a control program by which the power factor of the load is computed when performing the two-phase modulation control. With the control program, whether the computed power factor is less (smaller) than the preset threshold value is determined. If the power factor is greater than or equal to the threshold value, the phase shift is performed to shift the central time point during the ON period or the OFF period for the two phases other than the stop phase in the two-phase modulation control by 180 degrees. If the power factor is less than the threshold value, the two-phase modulation control is performed without performing the phase shift.

The threshold value is set in the following manner. The relationship between the power factor and the capacitor ripple current is compared between the case in which only the two-phase modulation control is performed to control the three-phase inverter 12 and the case in which the phase shift is added to the two-phase modulation control to control the three-phase inverter 12. The threshold value is set to be greater than or equal to a value of the power factor at which the capacitor ripple currents of the two cases are the same with each other. The threshold value is set in accordance with the specifications of the three-phase induction motor 30, which serves as a load controlled by the inverter device 10, for example.

Next, operation of the inverter device 10 as above configured will be described below.

The inverter device 10 is mounted on a forklift, for example. The positive input terminal 14 of the three-phase inverter 12 is connected to the positive terminal of the battery 11, and the negative input terminal 15 is connected to the negative terminal of the battery 11 through wirings. The inverter device 10 is used with the output terminals, i.e., a U-phase terminal U, a V-phase terminal V, and a W-phase terminal W connected to the three-phase induction motor 30.

The controller 13 controls the three-phase inverter 12 according to one of the two-phase modulation control in which the stop period of the stop phase is set across the peak of the current and the two-phase modulation control in which the phase shift is added to the two-phase modulation control to drive the three-phase induction motor 30. The controller 13 determines which two-phase modulation control is performed on the basis of the power factor at the time of driving the three-phase induction motor 30. The two-phase modulation control method and the control method in which the phase shift is added to the two-phase modulation control are performed using publicly-known methods.

Next, the control method will be described according to the flowchart in FIG. 2.

The controller 13 computes the power factor from the currents that flows into the three-phase induction motor 30 and the voltages in step S1. The computation of the power factor is performed using detection signals of the current sensors 17*a* and 17*b*, and detection signals of the voltage sensors 18*a* and 18*b*. The controller 13 determines whether the power factor is greater than or equal to a preset threshold value in step S2. If the power factor is greater than or equal to the threshold value, the controller 13 proceeds to step S3 and performs the phase shift control, i.e., the two-phase modulation control to which the phase shift is added. If the power factor is less than the preset threshold value in step S2, the controller 13 proceeds to step S4 and performs the two-phase modulation control without phase shift.

The controller 13, on the basis of the rotation angle of the three-phase induction motor 30 detected by the angle sensor 19 and the detection signals of the current sensors 17*a* and 17*b*, computes the stop period of the stop phase when the two-phase modulation control is performed and two-phase modulation voltage command values of the two phases other than the stop phase. When performing the phase shift control in step S3, the controller 13 supplies the switching element of one of the phases with the output voltage commands on the basis of the normal two-phase modulation voltage command values and supplies the switching element of the other one of the phases with the output voltage commands the phase of which is shifted by 180 degrees ($\pi$) with respect to the phase of the first phase. When performing the two-phase modulation control without phase shift in step S4, the controller 13 computes the two-phase modulation voltage command values of the two phases other than the stop phase and supplies the phases with the output voltage commands on the basis of the two-phase modulation voltage command values.

Figure 3:
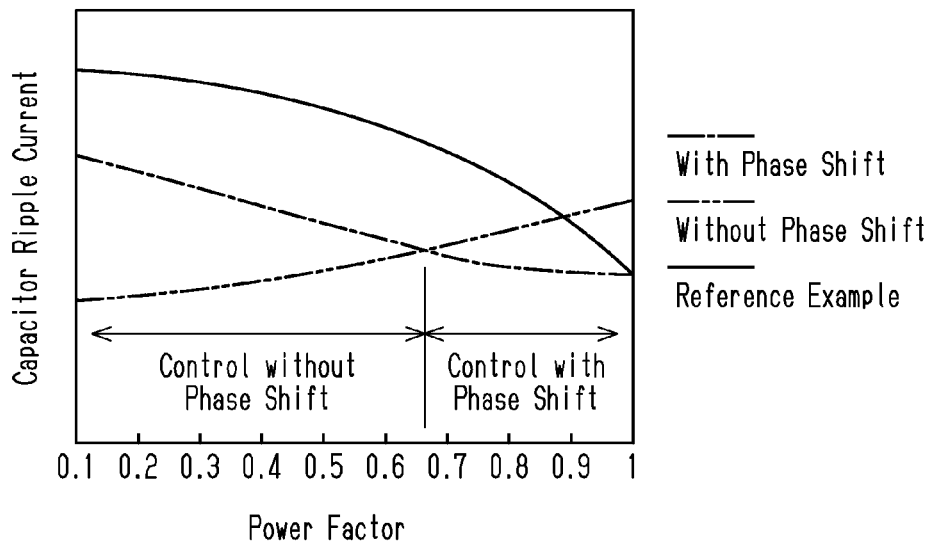
FIG. 3 is a graph illustrating a relationship between a power factor and a capacitor ripple current corresponding to a control method.
Figure 4A:
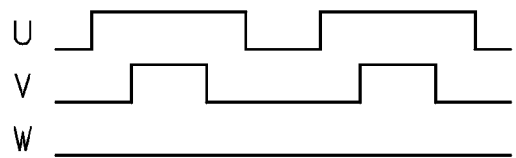
FIG. 4A is a timing chart illustrating three-phase control voltages in a two-phase modulation control.
Figure 4B:
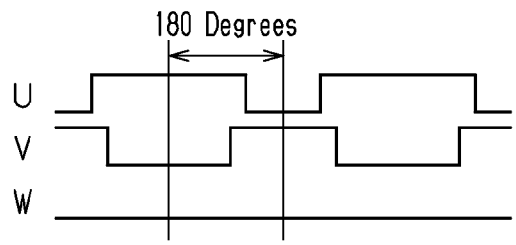
FIG. 4B is a timing chart illustrating three-phase control voltages in the two-phase modulation control and a phase shift control.
Figure 5:
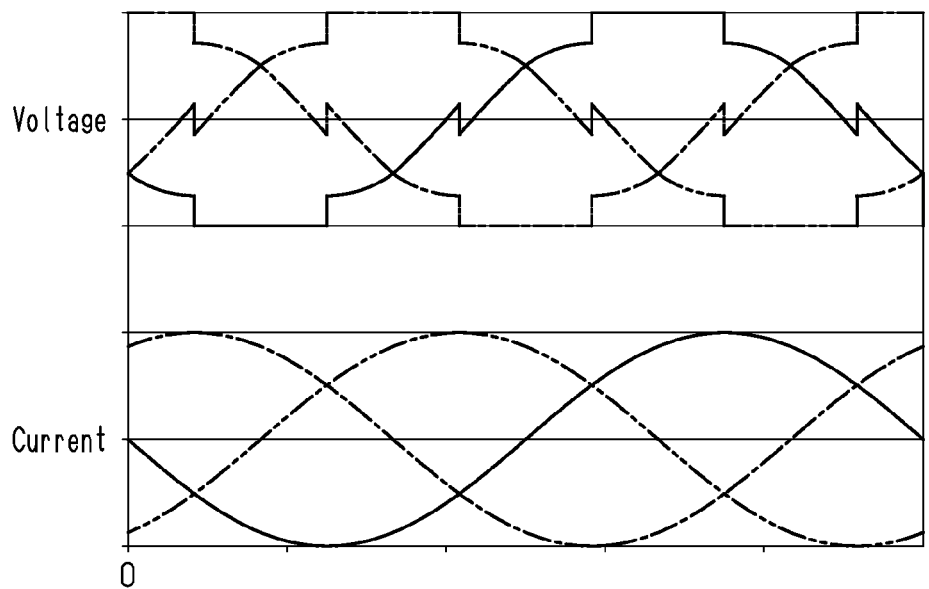
FIG. 5 is a graph illustrating changes in currents and voltages when the switching is not performed at a peak of the voltage.
Figure 6:
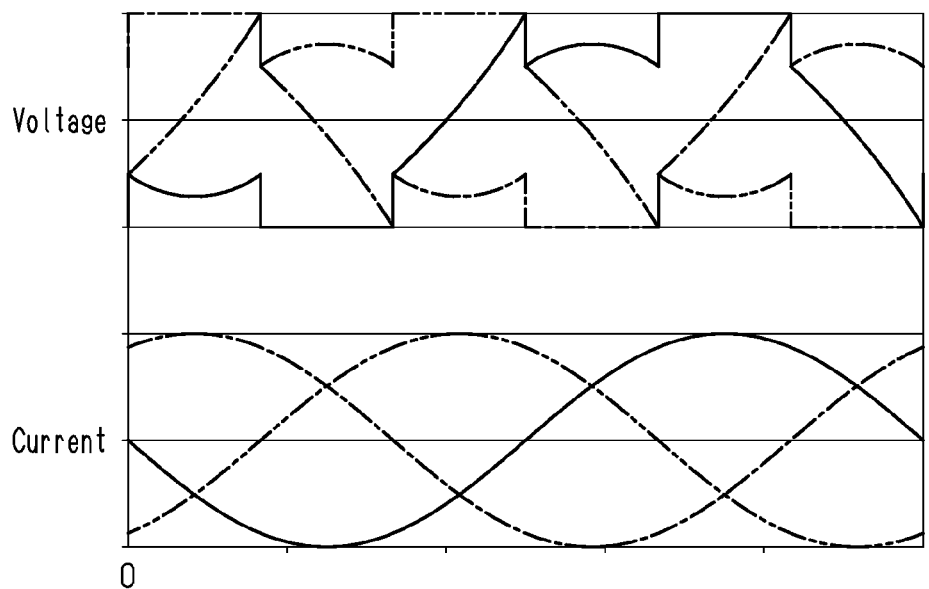
FIG. 6 is a graph illustrating changes in currents and voltages when the switching is not performed at a peak of the current.

FIG. 3 shows a relationship between the power factor and the capacitor ripple current when the stop period of the stop phase is set at a time point of the peak of the current and the two-phase modulation control is performed (with no phase shift) and when the phase shift is added to the two-phase modulation control and the two-phase modulation control is performed (with the phase shift). As a reference, FIG. 3 also shows a relationship between the power factor and the capacitor ripple current when the phase shift is added to the two-phase modulation control in which the stop period of the stop phase is not set at a time point of the peak of the current and the two-phase modulation control is performed. In FIG. 3, a long dashed short dashed line illustrates the case in which the phase shift is performed, a long dashed double-short dashed line illustrates the case in which no phase shift is performed, and a solid line illustrates a reference example.

As shown in FIG. 3 as a reference example, the capacitor ripple current when the period in which the switching of the two-phase modulation is not performed, i.e., the stop period of the stop phase is not set at a time point of the peak of the current and the two-phase modulation control in which the phase shift is performed by 180 degrees is performed is shown. This case shows that the capacitor ripple current is the smallest when the power factor is one, and the capacitor ripple current increases as the power factor decreases (is reduced).

In contrast, the long dashed double-short dashed line shows the capacitor ripple current when the period in which the switching of the two-phase modulation is not performed, i.e., the stop period of the stop phase is set at a time point of the peak of the current and the two-phase modulation control without phase shift is performed. This case shows that the capacitor ripple current is the greatest when the power factor is one, and the capacitor ripple current decreases as the power factor decreases (is reduced). The capacitor ripple current when the power factor is one is greater than that of the reference example. However, this case shows that if the power factor is less than approximately 0.9, the capacitor ripple current is smaller than that of the reference example.

In the case in which the stop period of the stop phase is set at a time point of the peak of the current and the two-phase modulation control in which the phase shift is performed by 180 degrees is performed, the capacitor ripple current is the same as that of the reference example when the power factor is one. The capacitor ripple current increases as the power factor decreases. However, the capacitor ripple current hardly increases if the power factor is from one to approximately 0.8. If the power factor is less than approximately 0.8, the increase ratio of the capacitor ripple current is increased. In comparison to the case in which the stop period of the stop phase is set at a time point of the peak of the current and the two-phase modulation control without phase shift, if the power factor is in a range from one to approximately 0.66, the capacitor ripple current is smaller than in the case in which the two-phase modulation control without phase shift is performed.

Accordingly, when the stop period of the stop phase is set at a time point of the peak of the current and the two-phase modulation control is performed, it is only necessary to determine whether the phase shift should be performed depending on the power factor and to determine whether the power factor is less than the preset threshold value. If the power factor is greater than or equal to the threshold value, it is determined that the phase shift should be performed. If the power factor is below the threshold value, it is determined that the phase shift should not be performed.

The present embodiment has the following advantages.

(1) The inverter device 10 includes a three-phase inverter 12 and a controller 13 capable of performing two-phase modulation control for switching between ON and OFF states of the switching elements Q1, Q3, and Q5 on the high potential side and the switching elements Q2, Q4, and Q6 on the low potential side of the phases of the three-phase inverter 12. The inverter device 10 further includes a power factor computation unit, which computes a power factor of a load, and a determination unit, which determines whether the power factor computed by the power factor computation unit is less than the preset threshold value. If the computed power factor is greater than or equal to the threshold value, the controller performs a phase shift to shift by 180 degrees the central time point of an ON period or the central time point of an OFF period for the two phases other than the stop phase in the two-phase modulation control. In contrast, if the computed power factor is less than the threshold value, the controller supplies the switching elements with ON and OFF control commands to perform the two-phase modulation control without performing the phase shift. Accordingly, when the induction motor is controlled according to the two-phase modulation control, the ripple current occurred in the smoothing capacitor 16 provided in the input of the three-phase inverter 12 is reduced. This reduces the size and the costs for the smoothing capacitor 16 as well.

(2) The stop period of the stop phase in the two-phase modulation control is set across the time point of the peak of the current. The threshold value is set in the following manner. The relationship between the power factor and the capacitor ripple current is compared between the case in which only the two-phase modulation control is performed to control the three-phase inverter 12 and the case in which the phase shift is added to the two-phase modulation control to control the three-phase inverter 12. The threshold value is set to be greater than or equal to the value of the power factor at which the capacitor ripple currents of the two cases are the same with each other. Therefore, the threshold value is set such that the load is driven by the inverter device 10 according to tests or simulations. This reduces the capacitor ripple current even if the load is driven in the state in which the power factor is low.

The embodiment is not limited to the above. For example, the present invention may be modified as follows.

The threshold value as a reference to determine whether the phase shift should be performed when performing the two-phase modulation control may be set to have a dead zone such that the threshold value is allowed to have a hysteresis. The phrase "have a dead zone" is directed to a predetermined range across the threshold value in which once the power factor reaches the threshold value and the control method is switched, the switching of the control method is not performed until the power factor is reduced from the threshold value to a value that is out of the predetermined range even if the power factor after the switching is below the threshold value. If the switching is performed when the power factor of the load is in the vicinity of the threshold value of the conditions of the switching of the two-phase modulation control, hunting will be caused by switching between the two-phase modulation control and the control in which the phase shift is added to the two-phase modulation control simply depending on whether the power factor is greater than or equal to the threshold value. This is not preferable. However, if the threshold value is set to have a dead zone, the occurrence of hunting is suppressed or avoided.

The memory 21 may store the number of rotations and the amount of the current of the three-phase induction motor 30, and the change history of the power factor so that the power factor may be computed from the past change history and the number of rotations and the value of the current of the motor 30 detected at that time.

The computation of the power factor is not limited to the method of computing the power factor each time using the detection signals of the current sensors 17a and 17b and the voltage sensors 18a and 18b. For example, a relationship among the power factor, and the number of rotations and the current of the three-phase induction motor 30 may be obtained from tests or simulations and stored as maps in the memory 21 so that the power factor may be computed from the maps and the detection signals of the current sensors 17a and 17b and the angle sensor 19.

The power factor may be detected by a power factor sensor.

In the graph illustrating the relationship between the power factor and the capacitor ripple current, the threshold value need not be set such that the power factor is greater than the points of intersection on the curved line between the case with the phase shift and the case without the phase shift. If the value of the capacitor ripple current corresponding to the power factor falls within a permissible range, the threshold value may be set such that the power factor is below the points of intersection on the curved line between the case with the phase shift and the case without the phase shift.

When the threshold value is allowed to have a dead zone, the range (width) of the dead zone may be changed (increased or reduced) depending on the current value, the voltage value, or the number of rotations of the three-phase induction motor 30.

The inverter device 10 may be used not only for controlling the three-phase induction motor 30 used in a forklift but also for controlling the three-phase induction motor 30 used in other electric appliances.

The invention claimed is:

1. An inverter device comprising:
    a three-phase inverter, wherein each phase includes a switching element on a high potential side and a switching element on a low potential side; and
    a controller programmed to perform two-phase modulation control on switching of the switching elements between an ON state and an OFF state, wherein
    the controller is programmed to compute a power factor of a load,
    the controller is programmed to determine whether the computed power factor is less than a preset threshold value,
    if the controller determines that the computed power factor is greater than or equal to the threshold value, the controller performs a phase shift to shift a central time point of an ON period or an OFF period for two phases other than a stop phase in the two-phase modulation control by 180 degrees, and
    if the controller determines that the computed power factor is less than the threshold value, the controller supplies the switching elements with ON and OFF control commands to perform the two-phase modulation control without performing the phase shift.

2. The inverter device according to claim 1, wherein
    a stop period of the stop phase in the two-phase modulation control is set across a time point of a peak of current,
    a relationship between the power factor and a capacitor ripple current is compared between a case in which only the two-phase modulation control is performed to control the three-phase inverter and a case in which the phase shift is added to the two-phase modulation control to control the three-phase inverter, and the threshold value is set to be greater than or equal to a value of the power factor at which the capacitor ripple currents in the two cases are the same with each other.

3. The inverter device according to claim 1, wherein the threshold value is set in consideration of hysteresis.

4. The inverter device according to claim 1, wherein the threshold value has a dead zone.

5. The inverter device according to claim 4, wherein the dead zone is set such that, once the power factor reaches the threshold value and a control method is switched, the dead zone is set in a predetermined range across the threshold value at which the control method is not switched even if the power factor after the switching is less than the threshold value.

* * * * *